Figure 1:
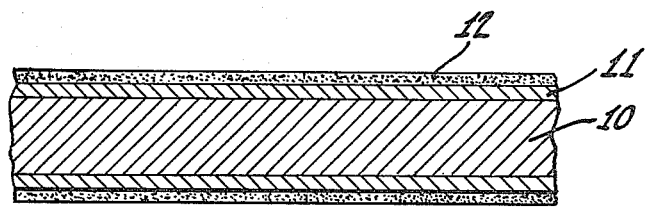

Dec. 6, 1955

T. A. STERNBERG 2,725,617

CARBONIZED COMPOSITE METAL

Filed Oct. 29, 1951

INVENTOR
THEODORE A. STERNBERG
BY
William A. Jalesak
ATTORNEY

United States Patent Office 2,725,617
Patented Dec. 6, 1955

2,725,617

CARBONIZED COMPOSITE METAL

Theodore August Sternberg, Basking Ridge, N. J., assignor to Radio Corporation of America, a corporation of Delaware Application October 29, 1951, Serial No. 253,640

8 Claims. (Cl. 29—195)

This invention relates to a structure comprising a composite metal having a coating of carbon thereon, and more particularly to such structure in which the composite metal includes a core of steel.

Some types of electron tubes employ elements coated with carbon to facilitate heat dissipation therefrom. These elements may comprise anodes, shields, collars and other components of the tubes, which become heated excessively during operation of the tubes, unless some means for dissipating the heat therefrom is employed, such as a coating of carbon thereon.

Heretofore, the elements referred to have been made of nickel coated with carbon. Nickel has proven particularly advantageous as the base metal since it can be quickly and easily degassed. One of the gases that may be present in the base metal is particularly troublesome where the base is coated with carbon. This gas is oxygen which when diffused to the surface of the base, readily reacts with the carbon coating to form a carbon gas. Such carbon gas adversely affects the operation of an electron tube in which the carbon coated gaseous base is employed.

While steel is a more readily available material than nickel and is less costly, it has not been used to any appreciable extent as the base material for a carbon coated structure because of its relatively high occluded gas content and the considerable difficulty encountered in removing the occluded gases therefrom. One attempted use of steel as the base material of a carbon coated element has involved the application of an intermediate coating of a metal, such as nickel, to the element. However, while this has had limited success in electron tubes, characterized by relatively low operating temperatures, such coated elements have been unsatisfactory when used in rectifiers or tubes of relatively high power output. The relatively high temperatures of operation of such tubes increases the evolution of gas from the base material to such an extent that the gas diffuses through the intermediate coating and reacts with the carbon coating to form the objectionable gas compounds referred to.

Accordingly, it is an object of the invention to provide a carbon coated electron tube element of reduced cost.

It is another object to provide a coated element having a steel base adapted for advantageous use in electron tubes operated at relatively high temperatures.

It is a further object of the invention to provide a carbon coated structure wherein the base material is comprised preponderantly of steel and which is suitable for elements of electron tubes operated at relatively high temperatures without objectionable gas contamination of the tubes.

Another object is to provide a carbon coated structure which includes a steel base characterized by reduced gas evolution particularly at relatively high temperatures and is readily workable.

A further object is to provide a carbon coated structure including a steel alloy base of reduced gas evolution at elevated temperatures and an intermediate metal sheath for preventing diffusion of any evolved gas in the base to the carbon coating at such elevated temperatures.

Another object is to provide a carbon coated structure including a base and a nickel coating on said base having a thickness for preventing the diffusion therethrough of gases evolved in said base.

According to the invention a carbon coated structure or element is provided having a base made preponderantly of steel and including from 0.05 to 2.5% aluminum by weight. This aluminum content in the base serves to reduce at least some of the gaseous oxides that may be occluded in the steel, to thereby reduce the amount of such oxides evolved from the base when the structure or element is operated at relatively high temperatures. While the presence of the aluminum referred to, in the steel base, effectively reduces the amount of gas evolved by the base material, it is not believed it eliminates such gas evolution completely. Therefore additional means is provided according to the invention to prevent reaction between the relatively small amount of gases evolved and the outer carbon coating. This means comprises a coating or layer of nickel interposed between the base and the carbon coating. According to the invention, the coating of nickel has a predetermined thickness in relation to the thickness of the base to provide an effective barrier to the diffusion therethrough of gas evolved by the base. The thickness of the intermediate nickel coating is such that its mass is at least 10% by weight of the mass of the base material.

The invention therefore provides a carbon coated structure which permits use of steel as the base material, without objectionable reaction between gases in the base with the carbon coating. This result is accomplished first by reducing incidents of gas evolution in the base and secondly by providing an effective barrier to any gas diffusion to the carbon coating. Applicant has found that a desirable balance occurs between gas evolution and barrier effectiveness, when the steel of the base includes from 0.05 to 2.5% aluminum and when the barrier coating of nickel is at least 10% by weight of the base material. This permits a predominant portion of the base to be made of steel, thus reducing the cost of the carbon coated elements referred to.

Figure 2:
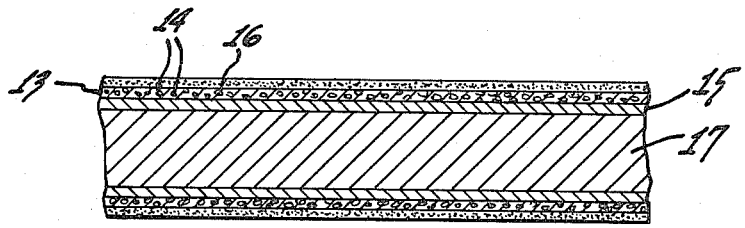
Figure 3:
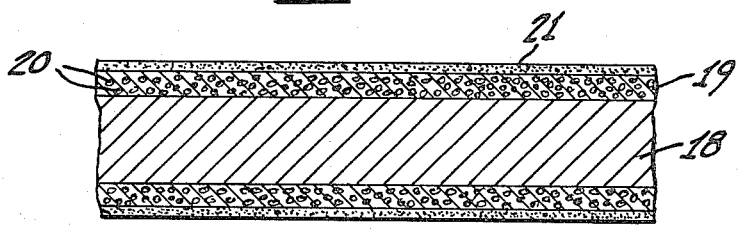

Referring now to the drawing for a better understanding of the invention,

Figure 1 is a cross-section of a fragment of a carbon coated composite structure according to the invention;

Figure 2 is a cross-section of a fragment of a composite structure according to the invention in which a matrix is employed for good adherence of the carbon coating on the structure; and Figure 3 is a fragmentary cross-section of a modified composite structure according to the invention in which the intermediate coating is composed of a matrix serving the dual function of barring gas diffusion to the outer carbon coating and providing a good bond for the carbon coating.

Referring first to Figure 1, one form of the composite structure of the invention includes a core or base 10 made of an alloy comprising from 0.05 to 2.5% aluminum and the remainder steel. Over the core or base referred to is disposed a coating of nickel 11 having a thickness measured by a predetermined mass relationship to the base 10. This mass relationship is such that the coating is at least 10% by weight of the mass of the core. Over the nickel coating is applied an outer coating of carbon 12, as by gas carbonizing.

For many years, a steel known in the art as rimmed steel was used as the base material for carbon coated electron tube elements. While it was relatively gassy, its cheapness and improved effectiveness of getters used, rendered it tolerable for elements used in receiving type tubes having a relatively low operating temperature. However, it was found unsatisfactory in rectifier tubes and tubes having a relatively high power output. Furthermore, when procedures for the manufacture of receiving type tubes were modified to permit higher production speeds, less time was allowed for exhaust resulting in increased gas evolution by the base to prohibitive values.

As a consequence of these difficulties, a relatively gas-free aluminum killed steel, was substituted for the rimmed steel. The aluminum killed steel referred to contained 0.02% aluminum by weight. The use of the aluminum killed steel resulted in substantial improvement with respect to gas evolution and emission charactistics of tubes in which carbon coated aluminum killed steel elements were used. However, this improvement occurred only with respect to receiving type tubes which operate at relatively low temperatures. The aluminum killed steel referred to was unsatisfactory when incorporated in carbon coated elements used in relatively high power output tubes and in rectifier tubes, which operate at relatively high temperatures. At such high temperatures, it was found the relatively small amount of gases occluded in the steel did not completely combine with the aluminum, and as a consequence diffused to the surface of the steel where they formed gaseous carbon compounds having a deleterious effect on the emission of a tube in which the steel referred to was incorporated.

It will be noted from the foregoing, therefore, that the use of steel as the core of a carbon coated element for an electron tube, was heretofore found to be impractical where the tube was of a type involving a relatively high temperature of operation. And this was true even though attempts were made to bar gas diffusion to the carbon coating, as by means of an intermediate coating of a metal such as nickel. It is believed that the reason for poor results characterizing prior carbon coated structures even when the core was provided with an intermediate metal coating, resided in the failure to appreciate that a balance can be attained between the quantity of gas evolved by the steel base at relatively high temperatures and the effectiveness of the intermediate coating in barring diffusion of evolved gas to the outer carbon coating. Consequently no attempts were made to control the rate of gas evolution and to determine the thickness of the intermediate coating in relation to said rate.

One reason why this relationship between gas evolution and barrier function was not understood by the prior art, was most likely because the use of steel as the core of a carbon coated element was prompted by considerations of economy. Most economy resulted when a minimum of amount of nickel, or other intermediate coating metal was used. Therefore, the teaching of the prior art led away from the concept that increased thickness of the intermediate coating might bar diffusion of evolved gas to the outer carbon coating. Of particular significance in this connection is the fact that the relatively gassy steels employed in prior art carbon coated composite structures, would have made it necessary to thicken prohibitively the intermediate metal layer for adequately barring diffusion of the relatively large quantity of gas evolved by such steels. Such thick intermediate coatings would defeat the object of economy sought in substituting steel for a more expensive metal.

But even though the prior art had recognized that an intermediate coating of increased thickness would provide an increased barrier effect to gas diffusion, it provided no teaching with respect to the barrier effect of any particular thickness of coating. Thus, if it were assumed that increased thickness of the coating were desirable in this connection, the absence of any teaching as to the optimum thickness would probably lead prior workers to increase the coating thickness beyond that of a specific requirement and thus result in waste of the more expensive coating metal.

Therefore, both because steels used in prior art carbon coated elements were relatively gassy and because no critical thickness of the intermediate coating was known for prevention of waste, carbon coated steel core elements were not practicable for use in electron tubes operating at relatively high temperatures.

According to the invention, the intermediate coating, preferably of nickel, need not be prohibitively thick, and as a matter of fact this coating, while in some cases thicker than prior art coatings, is still of such practical thinness as to render the use of steel as the core material of appreciable economic value for carbon coated elements subjected to relatively high temperatures.

Applicant has found that a definite relationship exists between the gas content of a steel and the thickness of a barrier layer of metal such as nickel for preventing diffusion through the barrier layer of evolved gases in the steel. More particularly, applicant has found that a steel having alloyed therewith from 0.05 to 2.5% by weight of aluminum is characterized by reduced gas evolution requiring a barrier coating of nickel thereon, having a mass of about 10% that of the mass of the steel, for effectively preventing diffusion of evolved gas therethrough. A carbon coating thereafter applied to the barrier or intermediate coating of nickel thus will be effectively protected from the evolved gas. A composite element having a core of the steel alloy referred to, the barrier coating of nickel of the thickness indicated, and an outer coating of carbon, will be free from objectionable gas generation during use of the element in an electron tube such as a rectifier or high power output tube operated at relatively high temperatures.

In the modification illustrated in Figure 1, the intermediate coating of nickel 11, may be applied by electroplating to secure maximum denseness to reduce the overall dimensions of the composite structure, where this is desirable. However, such coating has a relatively smooth outer surface to which the outer layer or coating of carbon does not strongly adhere.

Therefore, according to the modification of Figure 2, a sintered matrix 13, for example, of nickel particles, is sintered to the intermediate plated coating 15, the pores 14 of the matrix, at least adjacent the outer surfaces of the matrix, serving to receive and anchor carbon particles in a relatively strong bond. The carbon may be applied in suitable volume to form an outer coating 16 of carbon on the matrix referred to. The core 17 comprises an alloy of steel and from 0.05 to 2.5% by weight of aluminum.

In the modification of Figure 2, the mass of the intermediate plated coating 15 of nickel, for example, may be reduced slightly in view of the added barrier effect provided by the sintered nickel coating 13. I have found that the impregnated carbon penetrates inwardly of the sintered coating to a distance equal to no more than about one-half its thickness. The sintered coating 13 therefore provides an added barrier to diffusion of evolved gases to the carbon coating. However, the effectiveness in thickness of a sintered coating as a barrier to gas diffusion has been found to be about one-half that of a plated or fused coating. Therefore, the portion of sintered coating 13 that is free from carbon impregnation, has a gas barrier function per unit of thickness equal to slightly more than one-half that of the intermediate nickel coating 15. It is customary to form the sintered nickel coating to a thickness wherein its mass is from 8 to 10% that of the core. Assuming that one-half of this thickness is free from carbon impregnation, this provides a gas barrier having the effectiveness of a solid mass from 2 to 2½% of the mass of the core. Therefore, when a sintered matrix 13 is used over the intermediate coating 15, the mass of the intermediate coating need only be from 7½ to 8% that of the core. This represents a further saving in the amount of the intermediate coating metal used in the novel carbon coated element of the invention.

For securing good adherence of a carbon coating to a base, wide use is now made of a coating of sintered nickel particles for receiving in firmly anchored relation particles of the carbon coating. To prevent excessive penetration of the matrix by the carbon particles, the particles employed may be of a size slightly larger than the spaces defined by the pores. The resultant forced entry of the carbon particles in the pores referred to will effectively limit the depth to which the carbon penetrates the matrix, and will strengthen the bond between the carbon coating and the matrix. There is therefore an appreciable portion of the matrix coating to which the carbon particles do not penetrate, and which, accordingly as indicated above, supplements the barrier function of the intermediate coating 15 of Figure 2.

This utilization of the sintered matrix 13 as a portion of the barrier structure with consequent economy in the thickness of the intermediate coating 15, is preferable over the structure shown in Figure 1.

However, the preferred embodiment of the invention is shown in Figure 3. This embodiment includes a core 18 made of an aluminum-steel alloy in which the aluminum content is from 0.05 to 2.5% by weight of the steel. Over this core is disposed a coating 19 made of a matrix of sintered particles such as nickel. The matrix referred to is preferably applied in two courses, each of which involves a mass from 8 to 10% of the mass of the core 18. The total mass of the matrix 19 of Figure 3 is therefore from 16 to 20% of that of the core 18. Pores 20 in the matrix effectively anchor carbon particles of the outer carbon layer 21.

While it has been indicated before herein that carbon penetrates a matrix having a mass of from 8 to 10% of the mass of the core to a depth of about one-half its thickness, this is an extreme case, the normal penetration being about one-third the thickness of the matrix. Therefore, in the example of Figure 3, assuming the penetration of the carbon is about one-third through a matrix mass from 8 to 10% of the mass of the core, the mass of the sintered layer free from carbon is from about 13 to 18% of the mass of the core 18. This carbon free mass in the matrix is nearly double the carbon-free mass of a plated coating. This increased carbon-free mass of the matrix is necessary for the reason that the barrier effect of the matrix coating is slightly more than half the barrier effect of a plated coating having the same mass as aforementioned.

While this may involve a slightly excessive amount of the matrix metal, it is preferred because of the ease with which the matrix may be applied to the core. In the examples of Figures 1 and 2, the plated or fused coatings 11 and 15 require more critical controls in application to avoid use of excessive coating material. The example of Figure 3, on the other hand, relies on present practices for applying a sintered matrix, and deviates therefrom only in that two courses of the matrices are applied instead of the customary one.

While it might be supposed that the addition of a larger amount of aluminum to the core alloy would permit the use of a thinner intermediate barrier coating than aforementioned, applicant has found that the addition of more than 2.5% aluminum adds no appreciable advantage in this connection. One reason for this is the fact that other gases, in addition to oxygen, are occluded in the steel core. The aluminum content has little or no effect on such other gases. Furthermore, an excessive aluminum content, say 5%, would render the material too stiff for forming operations such as rolling.

Further, while the intermediate coating may be provided with a mass in excess of 10% of the mass of the core, such excess is of no advantage over the 10% value indicated. However, a mass value of the intermediate coating of slightly above 10% represents an advantage over prior art composite elements of the type described, because the slightly larger mass would generally be of less magnitude than the mass indicated by the teaching of the prior art, as shown before herein.

While it has been stated above that the core of the novel composite element of the invention includes from 0.05 to 2.5% by weight of aluminum, this content is with reference to the finished core. It may be desirable to use more than 2.5% of aluminum initially when the aluminum-steel alloy is formed to initially reduce some of the occluded gases in the steel. Then after the alloy is formed and the core made thereof is incorporated in the composite element of the invention, the 2.5% maximum of aluminum then remaining in the core will serve to reduce gases evolved during use of the element in an electron tube, particular advantage resulting when the tube is of a type operated at relatively high temperature.

While the range of aluminum content in each of the cores 10, 17 and 18 shown in the three figures of the drawing, is stated to be from 0.05 to 2.5% by weight of the core, with the remainder steel, the preferable range is from 0.05 to 1.5% by weight. This preference is dictated by economy, in view of the relatively high cost of aluminum, and because it has been found that the combination of the barrier coating of the invention with the aluminum content in the core, render use of aluminum in the smaller amount satisfactory.

A further reason for preferring the smaller amounts of aluminum above indicated, is that such smaller amounts have reduced hardening effects on the core and thus contribute to ease in forming the core, as by rolling, to desired shape.

In the example of Figure 1, it has been found preferable to use about 0.75% aluminum by weight in the core 10. In the examples of Figures 2 and 3, 0.05% aluminum by weight in the cores 17 and 18 is preferred for reasons of economy and because of the added barrier effect of the matrix layer there employed.

It is apparent from the foregoing, that the invention provides a novel carbon coated composite element having a steel base or core and adapted for use with good results in electron tubes charaterized by relatively high operating temperatures. The invention, therefore, permits the substitution of relatively cheap steel for a more expensive metal such as nickel, in the core of the coated element, without sacrificing suitability of the element for uses to which a nickel core element is adapted.

What is claimed is:

1. A composite element adapted for use in electron discharge devices operable at relatively high temperatures, said element comprising a structure having a core of steel evolving gases at said relatively high temperatures, said core including from 0.05 to 2.5% by weight of aluminum for combining with at least a portion of said gases and without excessively hardening said core, said core having an outer coating of carbon for dissipating heat therefrom, said gases having the property of reacting with carbon to form carbon gases adversely affecting the operation of said discharge devices, said core having an intermediate coating of nickel, said coating of nickel having a mass of about 10% of the mass of said core for effectively preventing diffusion of the remainder of said first-named gases to said coating of carbon for preventing formation of said carbon gases.

2. A composite element according to claim 1 and wherein the amount of aluminum in said core is from 0.05 to 1.5% by weight of said core.

3. A composite element according to claim 1 and wherein the amount of aluminum in said core is about 0.75% by weight of said core.

4. A composite element according to claim 1 and wherein the amount of aluminum in said core is 0.05% by weight of the core.

5. A composite element adapted for use in an electron discharge device operable at relatively high temperatures, said element comprising a structure having a core made of an alloy of steel and aluminum, said aluminum being from 0.05 to 2.5% by weight of said core for at least partly degassing said steel without appreciably hardening the core, said core having an outer carbon coating for dissipating heat from said element and an intermediate nickel coating, said nickel coating having a mass of from 10 to 20% of the mass of said core for effectively barring diffusion of remaining gases from said core to said carbon coating, whereby the generation by said element at said relatively high temperatures of carbon gases harmful to the operation of said devices is prevented.

6. A composite element according to claim 5 and wherein said nickel coating comprises a plated portion adjacent said core and having a mass of from 7.5 to 8% of said core and another portion comprising sintered nickel particles sintered to said plated portion and having a mass of from 8 to 10% of the mass of said core for preventing diffusion of gases from said core to said carbon coating and for providing a relatively strong bond between said carbon and nickel coatings.

7. A composite element according to claim 5 and wherein said nickel coating comprises a matrix of nickel particles sintered to each other and to said core, for securely receiving said carbon coating, said coating having a mass of from 16 to 20% of the mass of said core for preventing diffusion of said gases to said carbon coating.

8. In a high power rectifier electron discharge device adapted to operate at a relatively high temperature, a metal element having desired utility when at relatively low temperatures, said element comprising a composite structure having thereon a coating of carbon for dissipating heat therefrom, said structure including a core made of an alloy of from 97.5 to 99.95% by weight of steel having occluded gases including oxygen therein and from 0.05 to 2.5% by weight of aluminum for reaction with at least some of said oxygen during operation of said device at said relatively high temperature, and an intermediate coating of nickel on said core, said coating of nickel having a mass of from 10 to 20% of the mass of said core for effectively barring diffusion to said carbon coating of gases surviving said reaction, to prevent undesired reaction between said surviving gases and said coating of carbon.

References Cited in the file of this patent

UNITED STATES PATENTS

| | | |
|---|---|---|
| 880,055 | Viertel | Feb. 25, 1908 |
| 1,000,717 | Conn | Aug. 15, 1911 |
| 1,703,940 | Kollmar | Mar. 5, 1929 |
| 1,781,305 | Smede | Nov. 11, 1930 |
| 2,146,098 | Van Gessel | Feb. 7, 1939 |
| 2,428,318 | Nachtman | Sept. 30, 1947 |